Sept. 9, 1969 O. W. SWENSON 3,465,960

MULTI-STYLUS ASSEMBLY

Filed April 5, 1965 2 Sheets-Sheet 1

INVENTOR:
OSCAR W. SWENSON
BY Michael J. Forsella
ATTORNEY

MULTI-STYLUS ASSEMBLY

Filed April 5, 1965 2 Sheets-Sheet 2

INVENTOR:
OSCAR W. SWENSON
BY
Michael J. Borsella
ATTORNEY

United States Patent Office 3,465,960

Patented Sept. 9, 1969

3,465,960
MULTI-STYLUS ASSEMBLY

Oscar W. Swenson, Cedar Grove, N.J., assignor to The Western Union Telegraph Company, New York, N.Y., a corporation of New York Filed Apr. 5, 1965, Ser. No. 445,481
Int. Cl. G06k 7/06
U.S. Cl. 235—61.11 8 Claims

ABSTRACT OF THE DISCLOSURE

The invention consists amongst other things, of a multi-stylus arrangement wherein a number of stylus assemblies each embody two or more styluses or flat laminations of unique contour. The laminations are provided with separators so that as the stylus assemblies travel over a data card in the reading thereof, double contact is made with the markings on the card.

The present invention relates to a novel sensing stylus and particularly of the kind employed to scan a sensitized card and complete a circuit according to the marks on the card.

The invention is particularly utile when employed, for example, in conjunction with a card feed mechanism such as described and claimed in application Ser. No. 251,189, now Patent No. 3,232,604, filed Jan. 14, 1963 by P. F. J. Recca and cooperating therewith to sense a data card of the type described and claimed in application Ser. No. 243,331, filed Dec. 10, 1962, by Robert Steeneck et al., and now abandoned, both of said applications being assigned to The Western Union Telegraph Company.

In use, a data card transmitter such as described in application Ser. No. 251,189 has a stock of business cards passing therethrough in single sequence.

The cards are preferably of the sensitized type described in application Ser. No. 243,331, and contain thereon particular bits of information such as numbers, letters, words, symbols, or the like. The cards are generally marked by means which leave a conductive mark on the surface of the card.

During the passage through the data card transmitter each card is subjected to a sensing means passing over the surface of the card to sense the said marks. The herein disclosed novel stylus constitutes said sensing means.

The signals sensed by the stylus are transferred to the electronic section not shown here, of the data card transmitter where they are read and transmitted as standard telegraph signals using the Baudot code at standard telegraph speeds, although the code may be expanded to another code number combination such as the 6-unit code in use for the stock market or the 8-unit code in use for Telex transmission. The signals so sensed may be transmitted to a standard teleprinter or reperforator, or directly into punched card terminal equipment or computers.

The invention consists essentially in the details of construction herein shown, and contemplates providing a new multi-stylus arrangement wherein each individual stylus assembly is composed of two or more styluses or flat laminations of unique contour, all embodied into a head or multi-stylus assembly. The flat elements or laminations comprising each stylus are arranged with their plane parallel to the direction of travel of the card and are provided with a separator therebetween so that double contact is made with the markings on the cards instead of single contact as heretofore.

In similar devices of the prior art single wire styluses have been employed to provide the sensing means herein described. But these were often bent and misaligned.

A bent and misaligned stylus tends to waver when a data card passes under it, and it tends to move out of its normal contact path with respect to the markings on the card, so that it may fail to sense some symbols on the data card entirely. Furthermore wire styluses tend to dig into the cards when the direction of the data cards is reversed thereby damaging the conductive ink markings on the cards.

It is therefore one of the objects of the present invention to provide a novel stylus wherein the foregoing disadvantages are eliminated, and to do so in an effective manner.

Another object of the invention is to provide a novel stylus and stylus assembly of the above indicated nature which will be rigid and stable and not susceptible to bending and misalignment with respect to its prescribed path of travel over the data cards.

Still another object of the invention is to provide a novel stylus which will make double contact with the markings on the card.

Another object of the invention is to provide a novel sensing stylus of the above indicated nature which will not dig into the surface of the cards.

A further object of the invention is to provide a novel sensing stylus of the above indicated nature with components economically and simply constructed, easy to manufacture, yet positive and reliable in use.

Further objects and advantages and features will appear more fully hereinafter from a consideration of the detailed description which follows, taken together with the accompanying drawings wherein one embodiment of the invention is illustrated by way of example. It is to be expressly understood however that the drawings are for the purposes of illustration only, and are not to be construed as defining the limits of the invention, reference being had for this purpose to the appended claims.

In the drawings wherein like reference characters indicate like parts:

Figures 1, 2:
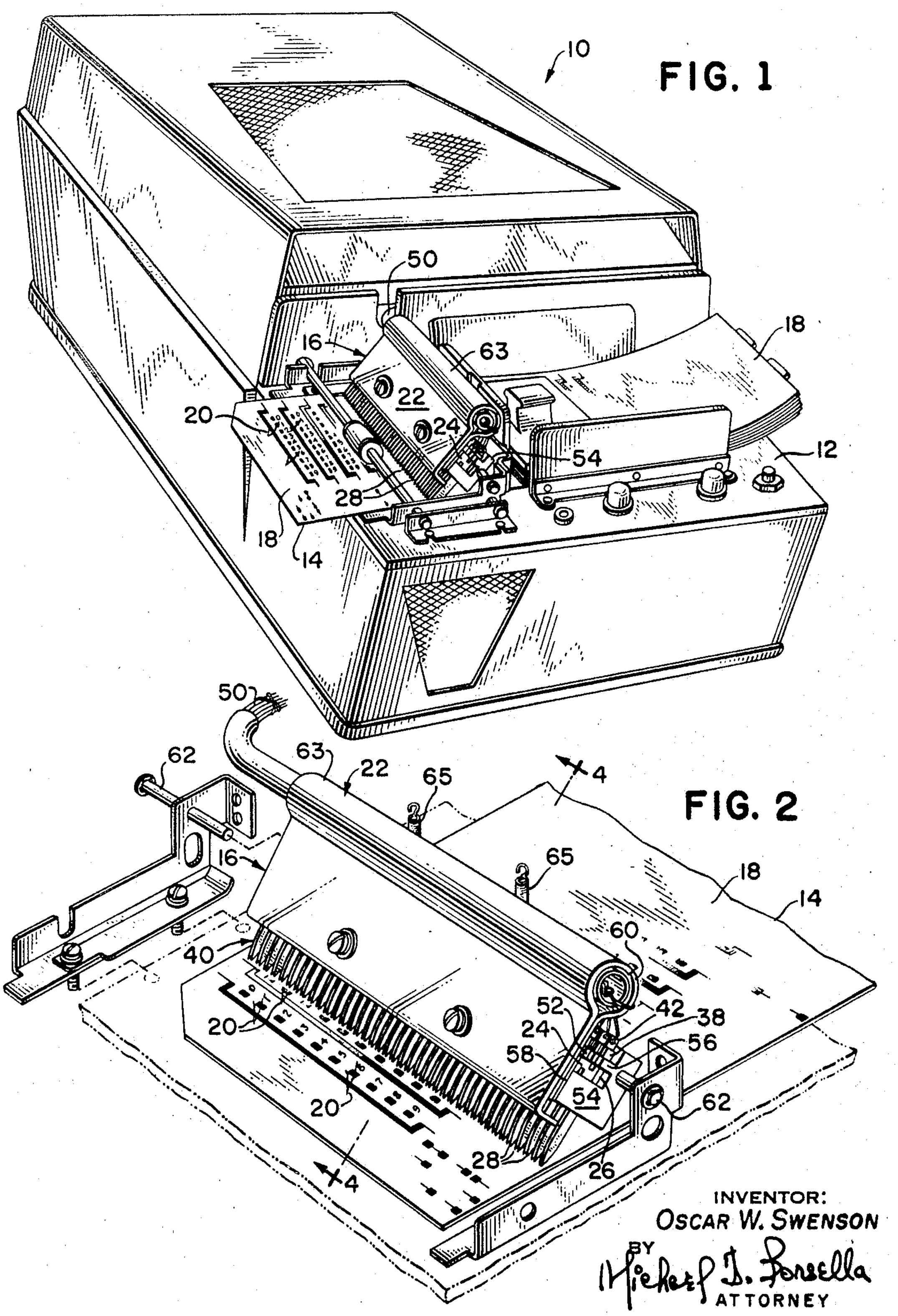
FIG. 1 is a perspective view of a data card transmitter showing the within stylus assembly in operation thereon.
FIG. 2 is a perspective view of the stylus assembly of this invention in the operation of sensing the markings on a data card.

Referring now to the drawings and more particularly to FIG. 1, there is shown a data card transmitter generally designated by the numeral 10 having a card feeding mechanism 12 adapted to urge a business data card 14 under a sensing head or assembly 16.

The card 14 embodies a sensitized surface 18 upon which certain conductive marks 20 for example have been made. The marks 20 are conductive having been made as heretofore explained by means not shown here, which leave a conductive work.

Figures 3, 4, 5, 6:
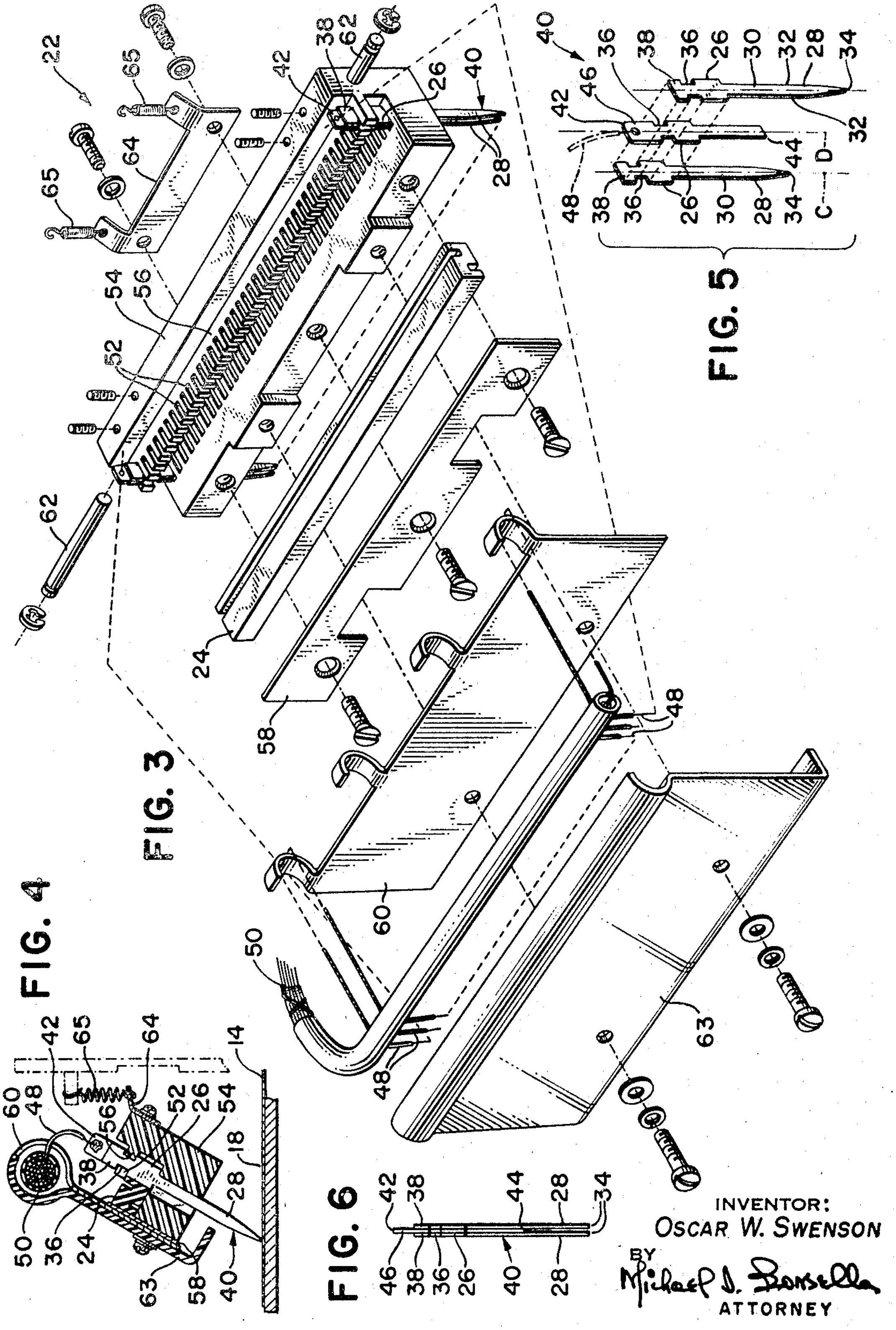
FIG. 3 is an exploded view of the stylus assembly showing the mounting arrangement of the various styluses.
FIG. 4 is a section view taken along the line 4—4 of FIG. 2.
FIG. 5 is an exploded view of an individual stylus showing the laminated components thereof.
FIG. 6 is a side view of a stylus assembly.

The card 14 is urged under a multi-stylus assembly or head generally designated as 22 (FIGS. 1, 2, and 3), comprising a pressure channel 24 preferably of neoprene bearing against a shoulder 26 on a plurality of styluses 28 (FIGS. 4 and 5).

The styluses are essentially flat and comprise an elongated shank portion 30 having parallel edges 32 culminat-on one end into a radius-tipped point 34. In operation, the radius-tipped point 34 is the portion of the stylus which comes in contact with the surface 18 of the card 14, and because of its rounded contour prevents the stylus from digging into the card. The opposite end of the shank 30 culminates in the shoulder 26 and a hinging slot 36 defined by the shoulder and a crosshead 38. The stylus 28 is symmetrical in contour about its vertical center line C (FIG. 5) so that installation thereof into the multi-stylus assembly 22 is facilitated, since either of the edges 32 may interchangeably serve as the leading or trailing edge of the stylus.

Referring now to FIG. 6, there is shown a complete stylus assembly 40. A plurality of such stylus assemblies in turn are installed into and comprise the multi-stylus assembly of head 22. The components of the stylus assembly 40 are shown in FIGS. 5 and 6, and consist of a pair of styluses 28 having therebetween a connector 42. The connector 42 is a flat conductive strip having substantially the same contour as the styli 28 except that a lower end 44 thereof terminates abruptly and short of the length of the adjacent styluses 28, and a crosshead 46 on the opposite end is longer than and protrudes substantially above the crossheads 38 on the adjacent styluses. It will be noted that the connector 42 also contains shoulders 26 which define together with the crosshead an identical hinging slot 36 as found on the styluses. The connector 42 is also symmetrical about its vertical center line D. The crosshead 46 of the connector 42 is connected to a conductor or wire 48 which along with corresponding wires from each stylus assembly comprise a harness 50 (FIG. 2) which serves to connect the various stylus assemblies forming the multi-stylus head or assembly 22 to the electronic portion (not shown here) of the data card transmitter 10.

The various stylus assemblies 40 are thus assembled into the head 22 by insertion into a plurality of slots 52 in an elongated block 54 having a shoulder 56 thereon adapted to mate with the hinging slot 36 on each stylus and connector block (FIGS. 3 and 4). The styluses are then held in place by the neoprene pressure channel 24 bearing thereagainst and sandwiched between the stylus assemblies 40 and a retaining plate 58 (FIG. 3). Harness-retaining plates 60 and 63 simply serve to support and contain the harness 50 to which the various wires 48 are connected.

The multi-stylus assembly or head 22 is pivotably mounted onto a pair of supporting brackets by means of pivot rods 62 on both ends thereof (FIG. 2). A pair of tension springs 65 suspended between a fixed bracket 64 and the head assembly 22, cause the head to rotate on the pivot rods 62. In this manner the individual stylus assemblies 40 are caused to make contact with the data cards in a more uniform manner. This flexible mounting arrangement also serves to automatically compensate for wear, and provides self-adjustment between the styluses and the surface of the cards.

Having thus described the invention, it will now be apparent to those versed in the art that in operation, when a data card such as 14 is passed under the multi-stylus assembly 22 the various stylus assemblies 40 will make sliding contact with the sensitized surface of the card by the tension in the springs 65 pivotally urging the head against the cards in a positive and uniform manner. Thus uniform contact is insured.

The stylus assemblies 40 comprising at least two individual styluses 28 spaced apart by the thickness of the connector 42 provide double rather than single contact so that in the mark sensing operation it is less likely that any marks such as 20 will escape normal contact with a radius-tipped point 34.

The fairly rigid stylus assemblies furthermore eliminate wavering as occurred with single wire styluses heretofore.

The neoprene pressure channel 24 it will be noted, not only bears against the shoulders 26 of the individual styluses (which are simply resting within the slots 52), to contain the styluses in place, but because of its resilient nature provides a differential in pressure along the line of styluses in the head 22, thus compensating for any data card irregularity or variation in card thickness along its width.

There are thus provided means whereby the several objects of this invention are achieved. While only one embodiment and one application of the invention has been illustrated and described, by way of example, it will readily be apparent to those versed in the art that changes in form and modifications may be made without departing from the scope and spirit of the invention.

What is claimed is:

1. In a multi-stylus assembly adapted for installation in a data card transmitter for sensing marks on the surface of data cards processed through the transmitter, the combination comprising, an elongated block equal in length to at least the width of the data cards, a plurality of stylus assembly retaining slots along the length of said block in a plane parallel to the direction of travel of the data cards, said slots defining a shoulder along the length of the block, a stylus assembly in each slot consisting of at least two styluses with a connector therebetween, said styluses and connector having identical slots adapted to mate with said shoulder to allow a hinging movement of the styluses and connector within the slots, a neoprene channel bearing against the styluses and connectors to retain the same within said slots, a pivot pin on each end of the block for pivotally mounting the multi-stylus assembly onto the data card transmitter, and resilient means fixed to the transmitter and the multi-stylus assembly for rotating the multi-stylus assembly about the pivot pins against the surface of the data cards.

2. The multi-stylus assembly claimed in claim 1 wherein said resilient means comprise at least two springs spaced to provide uniform contact of the multi-stylus assembly against the face of the data cards.

3. A multi-stylus assembly for a data card transmitter adapted to sense marks on a data card and cause electrical signals to be transmitted into the data card transmitter according to said marks, comprising an elongated block having a plurality of slots therein, a shoulder along the length of the block, a stylus assembly comprising at least two individual styluses in each slot, a hinging slot embodied in each stylus, said hinging slot in each stylus being adapted to mate with said shoulder on the block, a radius on the tip of said styluses adapted to contact the card, a resilient channel for retaining the stylus assemblies within the slots, a pair of pivot pins for mounting the head assembly onto the transmitter, and resilient means pivotally urging the head assembly against the surface of the data cards.

4. The multi-stylus assembly claimed in claim 3 wherein each stylus assembly comprises a substantially flat connecotr between the styluses.

5. A multi-stylus assembly comprising, an elongated block having a plurality of slots along the length thereof, shoulder means adjacent the bottom of said slots, a stylus assembly in each slot consisting of at least two styluses, a connector between said styluses embodying a crosshead adapted to rest upon said shoulder means to allow a hinging action of the connectors within the slots, a radius tipped end on each stylus, and a resilient channel for retaining the styluses within the slots.

6. A stylus for a data card transmitter adapted to sense a mark on the data cards processed by the transmitter comprising, a flat elongated shank portion having a pair of edges parallel along a portion of the shank, said edges converging on one end into a radius tipped point for contacting the cards, shoulder means on the opposite end of said shank, and a crosshead defining a pair of hinging slots with said means, said slots being adapted for securing the stylus into the transmitter.

7. A stylus assembly for contacting the surface of a card being processed through a data card transmitter comprising, a pair of identical styluses, said styluses having a flat elongated shank portion with edges parallel along a portion of the shank converging on one end into a radius-tipped point for contacting the data cards, shoulder means on the opposite end of said shank, and a crosshead above said means defining a pair of identical slots therewith, a flat connector between said styluses having identical slots as said styluses, said slots in the styluses and connector being adapted to secure the stylus assembly into the tranmitter.

8. The stylus assembly claimed in claim 7, wherein said connector and styluses are vertically symmetrical and the connector embodies a crosshead protruding above the crosshead on the styluses for electrically connecting the stylus assembly with hte transmitter,

References Cited

UNITED STATES PATENTS

| | | | |
|---|---|---|---|
| 2,302,033 | 11/1942 | Johnson. | |
| 2,302,081 | 11/1942 | Weitmann. | |
| 2,932,690 | 4/1960 | Adams et al. | 178—14 X |

MAYNARD R. WILBUR, Primary Examiner

THOMAS J. SLOYAN, Assistant Examiner

U.S. Cl. X.R.

200—46; 339—59